US009477332B2

(12) United States Patent
Cuddihy et al.

(10) Patent No.: US 9,477,332 B2
(45) Date of Patent: Oct. 25, 2016

(54) SYSTEM AND METHOD FOR ENABLING TOUCHSCREEN BY PASSENGER IN MOVING VEHICLE

(71) Applicant: Ford Global Technologies, LLC, Dearborn, MI (US)

(72) Inventors: Mark A. Cuddihy, New Boston, MI (US); Manoharprasad K. Rao, Novi, MI (US); Louis Tijerina, Dearborn, MI (US); Walter Joseph Talamonti, Dearborn, MI (US); Devinder Singh Kochhar, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 192 days.

(21) Appl. No.: 14/223,081

(22) Filed: Mar. 24, 2014

(65) Prior Publication Data
US 2015/0268746 A1    Sep. 24, 2015

(51) Int. Cl.
G06F 3/041 (2006.01)
B60K 35/00 (2006.01)

(52) U.S. Cl.
CPC ............... *G06F 3/041* (2013.01); *B60K 35/00* (2013.01); *B60K 2350/1012* (2013.01); *B60K 2350/1028* (2013.01); *B60K 2350/901* (2013.01); *B60K 2350/903* (2013.01); *B60K 2350/906* (2013.01); *G06F 2221/2149* (2013.01)

(58) Field of Classification Search
CPC combination set(s) only.
See application file for complete search history.

(56) References Cited

U.S. PATENT DOCUMENTS

| 7,009,488 | B2 |  | 3/2006 | Schwartz et al. |
|---|---|---|---|---|
| 8,078,359 | B2 |  | 12/2011 | Small et al. |
| 8,099,209 | B2 | * | 1/2012 | Tschirhart .......... B60H 1/00985 701/36 |
| 8,116,937 | B2 |  | 2/2012 | Kumon et al. |
| 8,285,453 | B2 | * | 10/2012 | Schroeder .......... G01C 21/3641 180/173 |
| 8,363,025 | B2 |  | 1/2013 | Parkinson et al. |
| 8,390,592 | B2 |  | 3/2013 | Grundmann et al. |
| 8,457,838 | B1 |  | 6/2013 | Fear et al. |
| 8,704,651 | B2 | * | 4/2014 | Nix ........................ B60K 37/00 340/438 |
| 8,849,509 | B2 | * | 9/2014 | Liu .......................... G06F 7/00 455/456.2 |
| 2003/0220725 | A1 |  | 11/2003 | Harter, Jr. et al. |
| 2007/0032912 | A1 |  | 2/2007 | Jung et al. |
| 2008/0004769 | A1 |  | 1/2008 | Lenneman et al. |
| 2008/0053233 | A1 |  | 3/2008 | Sugiura |
| 2008/0192024 | A1 |  | 8/2008 | Mita |

(Continued)

OTHER PUBLICATIONS

UK Search Report dated Sep. 11, 2015 (8 pages).

(Continued)

*Primary Examiner* — Van Chow
(74) *Attorney, Agent, or Firm* — Frank A. MacKenzie; Bejin Bieneman PLC

(57) ABSTRACT

A system and method for controlling the performance of complex operations on a dashboard-mounted touchscreen in a vehicle moving above a predetermined minimal speed. The system includes a sensor for determining that the touchscreen is intended or going to be touched by driver and/or front seat passenger. A control, responsive to operation of the sensor, disallows or allows the touchscreen to be responsive to a touching. The touchscreen is not allowed to perform a complex operation when the vehicle is moving above the minimal speed if the touchscreen is touched by the driver. The touchscreen is allowed to perform a complex operation when the vehicle is moving above the minimal speed if the touchscreen is not going to be touched by the driver and is touched by the passenger.

17 Claims, 5 Drawing Sheets

(56) References Cited

U.S. PATENT DOCUMENTS

2009/0082951 A1    3/2009    Graessley
2010/0250044 A1    9/2010    Alasry et al.
2011/0246026 A1    10/2011    Shuster

OTHER PUBLICATIONS

Oliver, "Apple filing details safe touch-screen navigation system", Apple Insider, Mar. 26, 2009, 12 pages.

* cited by examiner

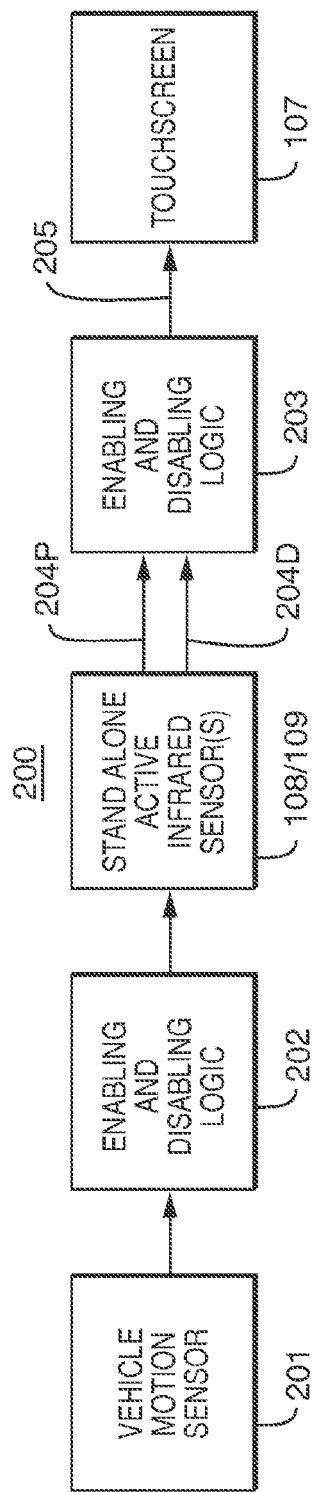
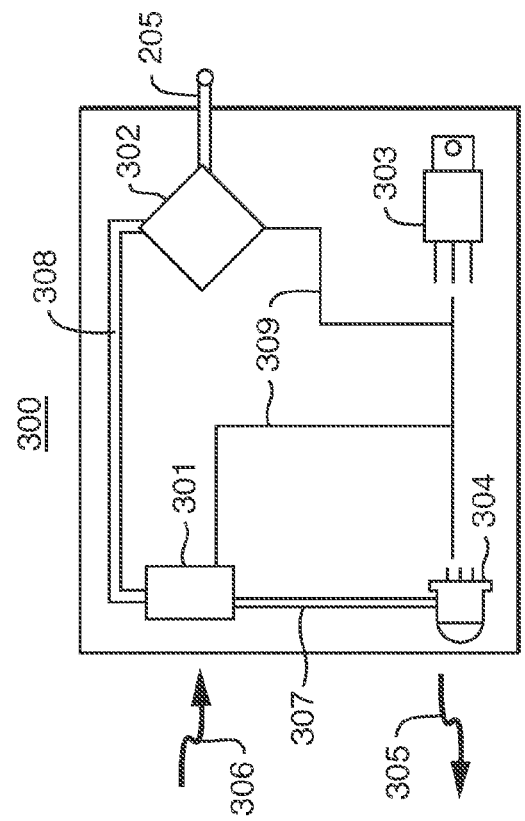
FIG. 2
FIG. 3

SYSTEM AND METHOD FOR ENABLING TOUCHSCREEN BY PASSENGER IN MOVING VEHICLE

BACKGROUND

Safety is paramount with respect to operating a motor vehicle. Driver distractions should be reduced as much as possible. Outside distractions are not under the control of the vehicle manufacturer. But, potential distractions inside the vehicle which can be reduced should be addressed. A touchscreen on the dashboard of a moving vehicle can be a distraction to the driver if he/she is tempted to reach over to touch it to perform complex functions that require significant interaction.

BRIEF DESCRIPTION OF THE DRAWINGS

FIG. 2 depicts an exemplary functional block diagram reflecting systems and/or methods described herein;

FIG. 3 is a block diagram of an exemplary infrared sensor subsystem with enabling/disabling logic which may be employed in FIG. 2;

DETAILED DESCRIPTION

Figure 1:
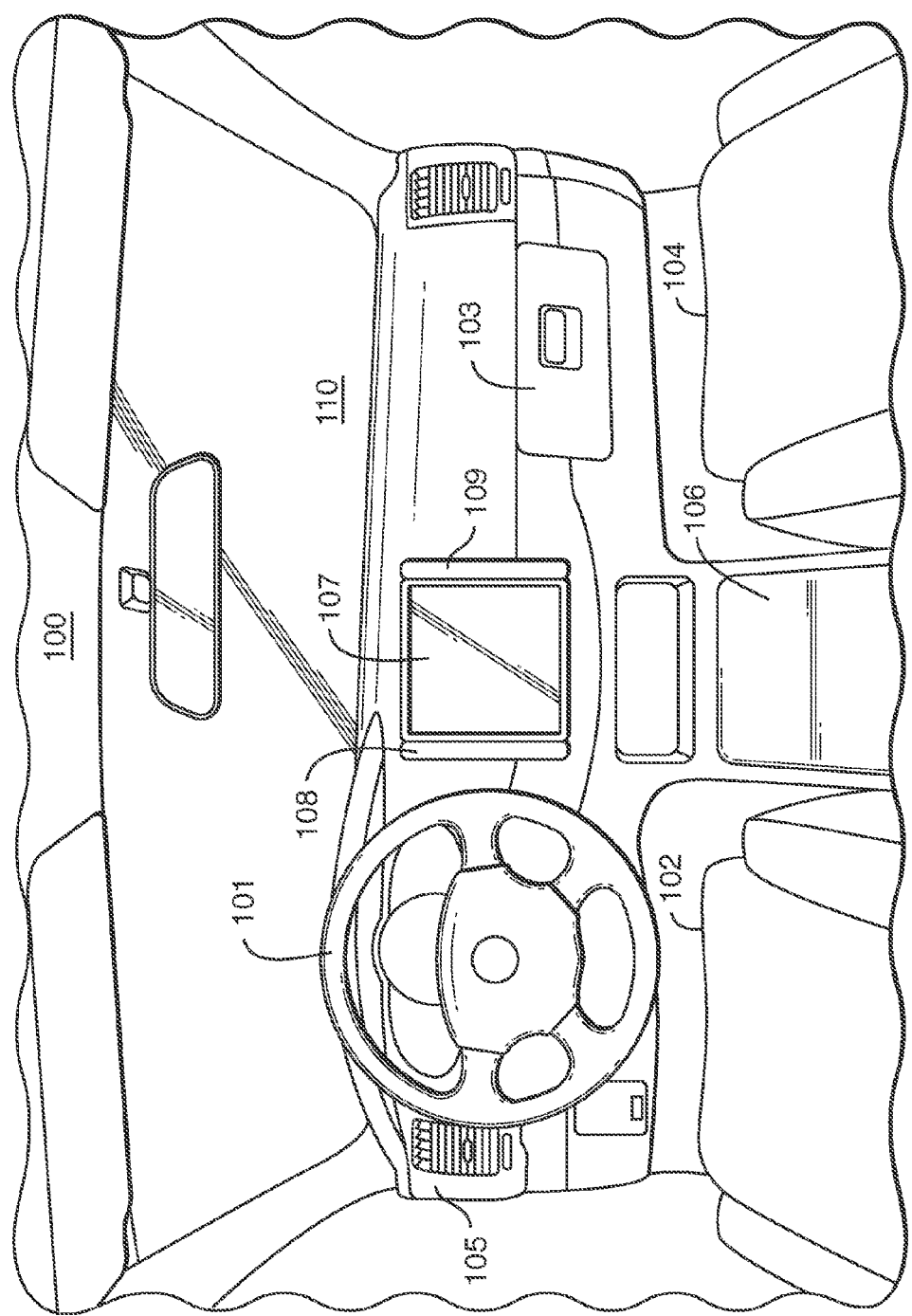
FIG. 1 depicts an exemplary vehicle occupants compartment in which systems and/or methods described herein may be implemented.

In this description, the same reference numeral in different FIGS. refers to the same entity. Otherwise, reference numerals of each FIG. start with the same number as the number of that FIG. For example, FIG. 3 has numerals in the "300" category and FIG. 4 has numerals in the "400" category, etc.

In overview, systems and methods described herein address the safety issue of an operable dashboard-mounted touchscreen, e.g., a global positioning system (GPS) touchscreen, in a moving vehicle possibly distracting its driver. In some vehicles, certain touchscreen operations may not be allowed when attempted by the driver of a vehicle moving above a predetermined minimal speed, e.g., 5 mph. These driver-forbidden operations may include: (a) using the touchscreen, for example, a keyboard on the touchscreen to enter a destination en route; (b) pairing a Bluetooth phone; (c) adding phonebook contacts or uploading phonebook contacts from a Universal Serial Bus (USB); (d) adding or editing address book entries; (e) enabling Valet Mode; (f) editing wireless settings; (g) editing Artist Alert. However, these driver-forbidden operations (hereinafter "complex" operations or functions) may be permitted by the front seat passenger in a vehicle moving above the predetermined minimal speed if, and only if, the driver is not attempting any operations at the time when the front seat passenger is attempting a complex operation. Other operations requiring far less operator interaction with the touchscreen such as, e.g., radio control or climate control, may always be allowed by the driver, as well as by the front seat passenger, in a vehicle moving above the predetermined minimal speed. (The word "passenger" is synonymous with "front seat passenger" hereinafter.)

A sensor is provided next to the touchscreen in the vehicle and the sensor determines that the touchscreen is intended or going to be touched by the hand (i.e., a finger) of a driver and/or the hand (i.e., a finger) of a front-seat passenger of the vehicle. The sensor's determination is based on a particular proximity of the hand(s) to the sensor when sensed by the sensor. A control, which is responsive to operation of the sensor, allows the touchscreen to be responsive to the touching of the touchscreen by the passenger for the driver-forbidden operations given above, in a vehicle moving over the predetermined minimal speed, and allows that only under certain conditions. In addition, when the sensor determines that the touchscreen is intended or about to be touched by the driver's hand, the control disallows the touchscreen to be responsive to the touching by the driver's hand or the passenger's hand for the complex functions when the vehicle is moving above the predetermined minimal speed. However, when the sensor determines that the touchscreen is not intended or not about to be touched by the driver's hand and is intended or going to be touched by the passenger's hand, the control allows the touchscreen to be responsive to touching by the passenger's hand for the complex functions, when the vehicle is moving above the predetermined minimal speed. In other words, the touchscreen shall be operative for the complex functions, when the vehicle is moving above the predetermined minimal speed, and responsive to touch if, and only if, the driver does not attempt to touch the touchscreen while the passenger does touch the touchscreen. Because the driver knows, in advance, that any attempt by him/her to touch the touchscreen while the vehicle is moving will not operate the otherwise-operable touchscreen, any distraction or temptation otherwise presented by the touchscreen to the driver has been reduced. The driver won't be tempted to try to perform complex functions.

The sensor can be an infrared sensor, such as an active infrared sensor which can also function as an infrared emitter. Or the sensor can be an ultrasonic sensor. Or the sensor can be derived from any other technology that can determine hand motion and/or hand proximity in a vehicle, including technologies based on radar or its principles. Interlocks can be included in the system, such as a signal related to the status of the front seat passenger's seat belt buckle switch (i.e., switch open or switch closed) and/or an occupant classification system (OCS) signal along with respective logic. The logic shall not permit the touchscreen to be responsive to touching by the passenger's hand for the complex functions when the vehicle is moving above the predetermined speed if the belt buckle switch is not closed or if the signal from the OCS indicates that the passenger is not in his/her front seat. The touchscreen remains operable and responsive to touch by the driver and the front seat passenger of the vehicle for all functions including complex functions when the vehicle is not moving at all or is moving under the predetermined minimal speed, regardless of whether or not an interlock(s) requirement is satisfied.

FIG. 1 depicts an exemplary vehicle compartment 100 for driver (not shown) and front seat passenger (not shown) in which systems and/or methods described herein may be implemented. Steering wheel 101 is at the left hand side of the vehicle and is positioned in dashboard 105 between driver's seat 102 and windshield 110, in typical fashion. Glove box 103 is at the right hand side of the vehicle and is positioned in dashboard 105 between passenger's seat 104 and windshield 110, in typical fashion. Touchscreen 107 is in the center of the vehicle and is positioned in dashboard 105 between center console 106 and windshield 110. Sensors 108 and 109 (including their respective emitter functions) are positioned left and right, respectively, of touchscreen 107, are each mounted in dashboard 105, are each long enough to meet or exceed the height dimension of the touchscreen so as to emit a particular radiation pattern alongside the full height dimension of the touchscreen, and also detect reflected radiation, if any.

Sensors 108 and 109 may be active infrared (IR) sensors and focused in a manner whereby each sensor emits or generates IR radiation in a plane parallel to the plane of the other sensor (hereinafter sometimes referred to as "radiation planes" or "radiation patterns" not shown), and where both radiation planes are orthogonal to the plane of the drawing of FIG. 1. The left sensor lens (not shown) that provides this radiation pattern for sensor 108 and the right sensor lens (not shown) that provides this radiation pattern for sensor 109 also ensure that its respective plane of radiation fans out (i.e., spreads vertically in the drawing) as a function of distance from the sensor, while remaining in its respective plane. (Both sensors including their respective emitter functionality may be collectively referred to herein as "sensor.")

This spreading of the radiation pattern, while remaining in its respective plane, ensures that an approaching occupant's hand shall be detected, and always be detected, at a particular proximity to the touchscreen. The particular proximity is the location of the hand as it pierces the radiation plane, thereby generating reflected IR signals detected by the sensor. A driver's hand moving towards touchscreen 107 from the left hand side of the vehicle will always be detected by sensor 108 at the particular proximity to the touchscreen when the driver's hand pierces or perturbs the radiation pattern from sensor 108. A passenger's hand moving towards touchscreen 107 from the right hand side of the vehicle will always be detected by sensor 109 at the particular proximity to the touchscreen when the passenger's hand pierces or perturbs the radiation pattern from sensor 109.

Other typical controls that might appear on a vehicle's dashboard, such as controls for radio, air-conditioner, heater, windshield wipers, cruise control, etc. are not shown, but are assumed to be available to driver and/or front seat passenger in typical fashion.

FIG. 2 is an exemplary functional block diagram 200 depicting systems and/or method described herein. There is shown: vehicle motion sensor 201, enabling/disabling logic 202, infrared sensors 108 and 109, enabling/disabling logic 203 and touchscreen 107. Vehicle motion sensor 201 senses if vehicle 100 is stationary (or under the de minimis limit) or, alternatively, is moving. Vehicle motion sensor 201 can be any device that detects vehicle motion such as a device for detecting rotation of the wheels or axles; for example, the device can be connected to the speedometer or to a source of speed information that feeds the speedometer.

The output of vehicle motion sensor 201 is input to enabling/disabling logic 202. Logic 202, if the vehicle is stopped, or moving below the predetermined minimal speed, allows unrestricted use of the touchscreen. Thus, when the vehicle is stopped, or moving below that speed, the driver and/or the front seat passenger can operate touchscreen 107 for all functions including the complex functions without any chance of the touchscreen being disabled. But, if the vehicle is moving above the predetermined minimal speed, logic 202 prevents driver operation of the complex functions and monitors the signal from sensors 108 and 109 to determine if the complex functions can be temporarily enabled (i.e., if sensor 109 detects a passenger hand while sensor 108 does not detect a driver hand).

The output of infrared sensors 108 and/or 109 feeds enabling/disabling logic 203 and is either one signal or two signals triggered by detection of perturbation of the radiation planes of sensors 108 and/or 109. One signal on line 204P may signify a particular proximity of the passenger's hand; the other signal on line 204D may signify a particular proximity of the driver's hand. If the driver's hand perturbs (e.g., pierces or intersects) the radiation field of sensor 108, enabling/disabling logic 203 outputs a disabling signal on line 205 to touchscreen 107 to make touchscreen 107 non-responsive to any touching by anyone including the driver for the complex operations. That frozen or non-responsive condition shall remain until the driver's hand no longer perturbs the radiation field produced by sensor 108 and, therefore, no longer causes reflected IR energy from being received by sensor 108.

That disabling signal is output on line 205 whenever there is a signal on line 204D, regardless of whether or not there is a signal on line 204P. If there is a signal on line 204P when there is also a signal on 204D, the signal on 204D overrides the signal on 204P and the complex operations cannot be performed. But, if there is a signal only on 204P and not on 204D, resulting from perturbation of the radiation field of sensor 109 by the passenger's hand while, at the same time, there is no disturbance of the other radiation field 108 by the driver's hand, the signal produced by enabling/disabling logic 203 on line 205 is an enabling signal and the complex operations can be performed by the touch of the passenger's hand. When the vehicle is stopped, or moving below the predetermined minimal speed, because of operation of enabling/disabling logic 202, touchscreen 107 remains operative and responsive to touch by anyone for any touchscreen operation.

FIG. 3 is a block diagram of an exemplary infrared sensor subsystem 300 with enabling/disabling logic which may be employed in FIG. 2. Active infrared sensor device 301 is operatively connected via communication link 307 to external infrared emitter device 304 and is also operatively connected via communication link 308 to microprocessor 302. Active infrared sensor device 301 and external infrared emitter device 304, taken together, may be functionally equivalent to either sensor 108 or sensor 109. In other words, there may be a separate pair of devices 301/304 for each of sensors 108 and 109. Only one such pair is shown in FIG. 3 to enhance clarity of presentation. Power conditioner 303 derives power from the vehicle's automotive battery (not shown), typically 12 volts, and supplies power at appropriate voltage and current levels on power bus 309 to at least sensor device 301, emitter device 304 and microprocessor 302. Microprocessor 302 includes appropriate logic and memory to properly function in this environment and perform the processing tasks which have been assigned to it, namely, to provide an enabling or disabling signal on line 205 in accordance with the description provided above.

Infrared emitter 304 emits IR radiation 305 in the two parallel radiation planes discussed above. Active infrared sensor device 301 detects reflected IR radiation 306 when a hand from the driver side pierces or perturbs the driver side radiation plane and/or when a hand from the passenger side pierces or perturbs the passenger side radiation plane. That detection is sent within infrared subsystem 300 to microprocessor 302 which, via its logic and processing power, determines if the radiation plane associated with left hand sensor 108 was perturbed or if the radiation plane associated with right hand sensor 109 was perturbed or both and, based on that determination, decides whether or not to permit touchscreen 107 to respond to a touching for the above-noted complex functions or operations when the vehicle is moving above the predetermined minimal speed. Microprocessor 302 then provides an output signal on line 205 to control touchscreen 107 to allow or disallow a screen response in accordance with its determination.

Figure 4:
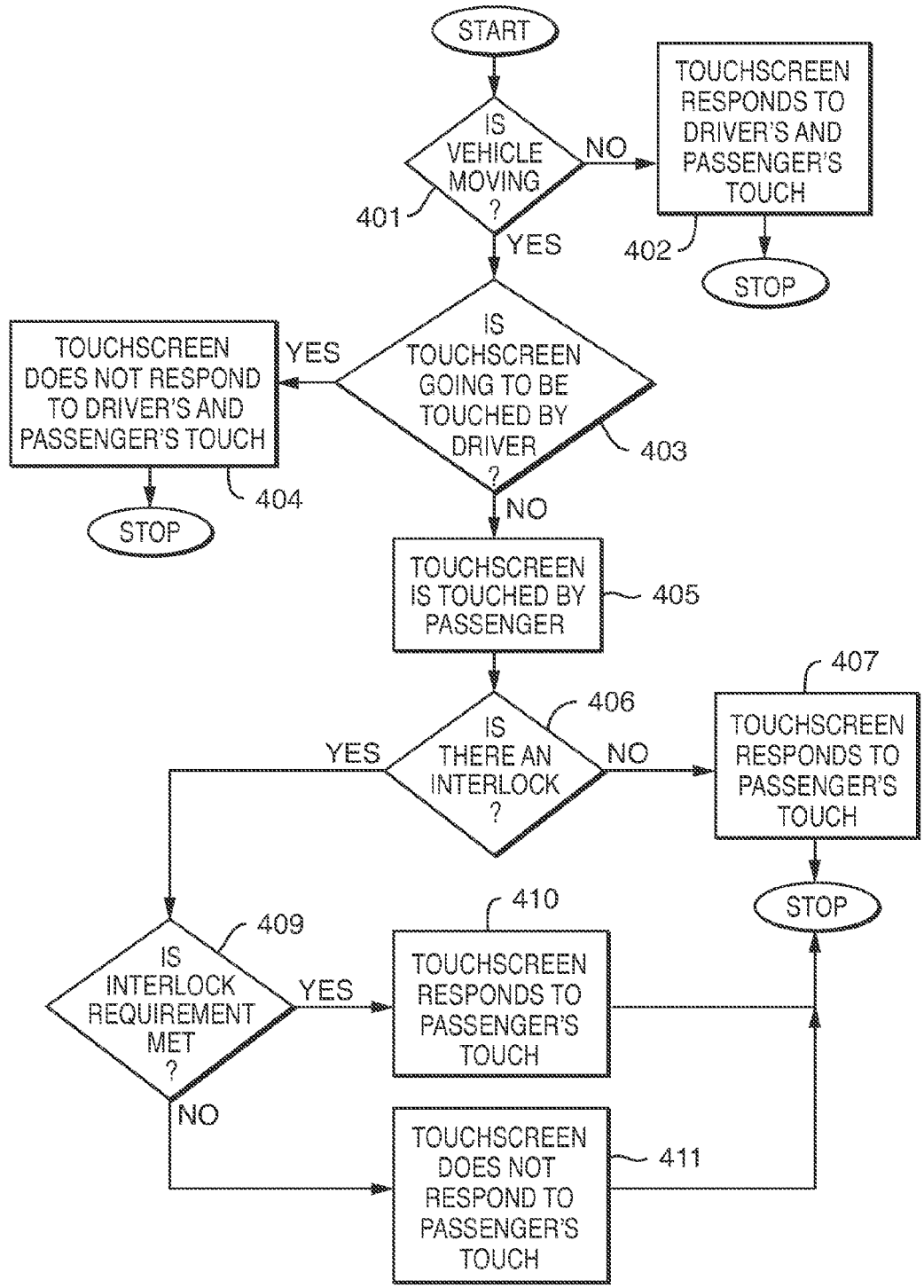
FIG. 4 is a flowchart depicting the methodology described herein with respect to a complex touchscreen operation.

FIG. 4 is a flowchart depicting the methodology described herein and is applicable only with respect to the complex touchscreen functions or operations. All other touchscreen functions or operations, i.e., all non-complex touchscreen functions or operations such as, e.g., climate control or radio control, are not subject to the algorithm depicted in FIG. 4. All references to touchscreen and driver's and passenger's touch are in accordance with the discussion above and FIGS. 1-3. The process starts with query block 401 which determines if the vehicle is moving. This takes into account if the vehicle is moving above or below the predetermined minimal speed. If not moving or if moving at or below the predetermined minimal speed, the process moves to block 402 where the touchscreen responds to the driver's and the passenger's touch and the process stops. But, if the vehicle is moving above the predetermined minimal speed, the process moves to the next query block 403 which determines if the touchscreen is intended to be touched, or is going to be touched, by the driver with respect to a touchscreen operation (i.e., it determines if the radiation plane associated with sensor 108 was pierced). If so, the process moves to block 404 where the touchscreen does not respond to the driver's and passenger's touch, if any, and the process stops.

However, if the touchscreen is not intended or is not going to be touched by the driver (i.e., the radiation plane associated with sensor 108 is not pierced) and is touched by the passenger in block 405, the process then moves to query block 406 which determines if there is an interlock involved. If not, the touchscreen responds to the passenger's touch in block 407 and the process stops. But, if there is an interlock, the process moves to block 409 which determines if the interlock requirement is met. The interlock may be one of those presented in FIGS. 5, 6 and 7, discussed below. If the interlock requirement is not satisfied, the process moves to block 411 where the touchscreen does not respond to the passenger's touch and the process stops. But, if the interlock requirement is satisfied, the process moves, instead, to block 410 where the touchscreen does respond to the passenger's touch, and the process stops.

Figure 5:
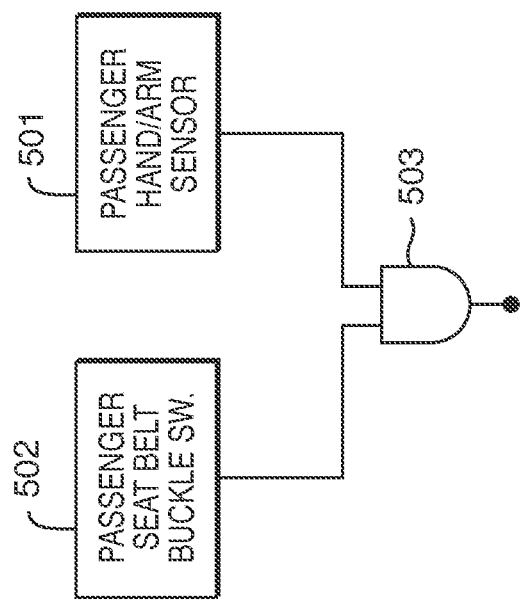
FIG. 5 is a first logic diagram reflecting a first interlock utilizing a passenger seat belt buckle switch, the interlock used in connection with FIG. 4.

FIG. 5 is a first logic diagram reflecting a first interlock. Passenger hand/arm sensor 501 is equivalent to sensor 109 which can sense if a hand from the passenger's side of the vehicle penetrates or perturbs its radiation plane. The output from that sensor is input to logical AND gate 503. The other input to gate 503 is the output derived from the front seat passenger's seat belt buckle switch 502. This switch can allow that output when the passenger's seat belt is buckled, thereby indicating that a front seat passenger is, in fact, in the front seat of the vehicle. Thus, gate 503 provides an output only when it receives both inputs confirming that (1) the passenger's side radiation plane is perturbed and (2) the passenger's seat belt is buckled, thereby adding a first measure of robustness or confidence that the system is sensing a passenger's hand and is not being compromised by the driver. Only if gate 503 provides such an output, is the FIG. 5 interlock requirement of query block 409 in the process flowchart of FIG. 4 met; otherwise it isn't met.

Figure 6:
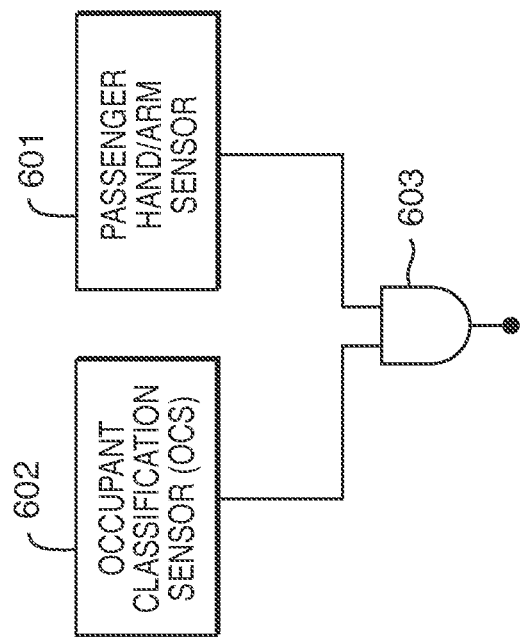
FIG. 6 is a second logic diagram reflecting a second interlock utilizing an occupant classification sensor (OCS), the interlock used in connection with FIG. 4.

FIG. 6 is a second logic diagram reflecting a second interlock which relies upon an occupant classification sensor (OCS). OCS 602 is a system which is currently used in the United States in vehicles weighing less than 8500 lbs. to activate/deactivate the passenger airbag; the front passenger airbag will not be deployed when an accident occurs, which otherwise would have been deployed even when there is no front seat passenger, if the OCS determines that there is no passenger in the front seat. Thus, the OCS, already installed in the vehicle, can confirm that the passenger seat is occupied when the OCS provides an affirmative signal to that effect, and can do this at virtually no additional cost. Passenger hand/arm sensor 601 is equivalent to sensor 109 which can sense if a hand from the passenger's side of the vehicle penetrates or perturbs its radiation plane. The output from that sensor is input to logical AND gate 603. The other input to gate 603 is the output derived from OCS 602. The OCS output can confirm that the passenger seat is occupied. Therefore, gate 603 provides an output only when it receives both inputs confirming that (1) the passenger's side radiation plane is perturbed and (2) the passenger's seat is occupied by a passenger, thereby adding another measure of robustness or confidence that the system is sensing a passenger's hand and is not being compromised by the driver. Only if gate 603 provides such an output, is the FIG. 6 interlock requirement of query block 409 in the process flowchart of FIG. 4 met; otherwise it isn't met.

Figure 7:
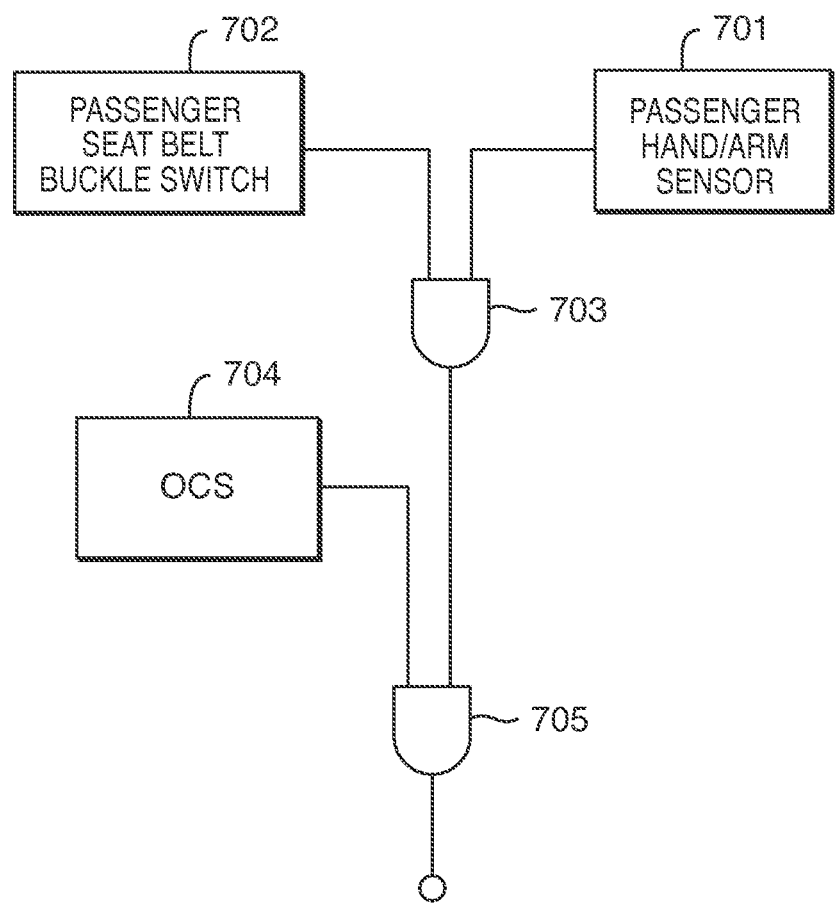
FIG. 7 is a third logic diagram reflecting a third interlock utilizing both the passenger seat belt buckle switch and the OCS, the interlock used in connection with FIG. 4.

FIG. 7 is a third logic diagram reflecting a third interlock which relies upon both the passenger seat belt buckle switch discussed in connection with FIG. 5 and the OCS system discussed in connection with FIG. 6. Output from passenger hand/arm sensor 701 is one input to logical AND gate 703 and output from passenger seat belt buckle switch 702 is the other input to logical AND gate 703. There is an affirmative output from AND gate 703 only if both inputs are affirmative. The output from logical AND gate 703 is one input to logical AND gate 705 and output from OCS 704 is the other input to logical AND gate 705. There is an affirmative output from AND gate 705 only if both of its inputs are affirmative. Therefore, there is an affirmative output from AND gate 705 if, and only if, (1) the passenger's side radiation plane at sensor 701 (i.e., sensor 109 in FIG. 1) is perturbed and (2) the passenger's seat belt buckle switch 702 is buckled and (3) OCS sensor 704 indicates a passenger is sitting in the front passenger seat, thereby adding yet another measure of robustness or confidence that the system is not being compromised by the driver. Only if gate 705 provides such an output, is the FIG. 7 interlock requirement of query block 409 in the process flowchart of FIG. 4 met; otherwise it isn't met.

In this specification, various descriptions have been presented with reference to the accompanying drawings. It will, however, be evident that various modifications and changes may be made thereto, and additional systems and/or methods may be implemented, without departing from the subject matter as set forth in the claims that follow. Therefore, the specification and drawings are to be regarded in an illustrative rather than restrictive sense.

What is claimed is:
1. A system, comprising:
a sensor that is programmed to determine that an operable dashboard-mounted touchscreen in a moving vehicle is going to be touched by a hand of a driver and/or a hand of a front-seat passenger of said vehicle based on particular proximity of said driver's hand and/or said passenger's hand to said sensor; and a control that is programmed to allow or disallow, based on input from said sensor, said touchscreen to be responsive to touching of said touchscreen by said driver's hand and/or said passenger's hand;

wherein the system includes logic to disable said sensor and said control when said vehicle is moving below a predetermined minimal speed, whereby said operable touchscreen is then fully responsive to touching by said driver's hand and/or said passenger's hand.

2. The system of claim 1 wherein said sensor is further programmed to determine that said touchscreen is going to be touched by said hand of said driver and wherein said control is further programmed to disallow said touchscreen to be responsive to touching of said touchscreen by said driver's hand.

3. The system of claim 2 wherein said touchscreen is centrally located on said dashboard, said driver being located left of said touchscreen and said passenger being located right of said touchscreen and wherein said sensor is located left of said touchscreen.

4. The system of claim 1 wherein said sensor is further programmed to determine that said touchscreen is going to be touched by said hand of said passenger and wherein said control is further programmed to allow said touchscreen to be responsive to touching of said touchscreen by said passenger's hand.

5. The system of claim 4 wherein said touchscreen is centrally located on said dashboard, said driver being located left of said touchscreen and said passenger being located right of said touchscreen and wherein said sensor is located right of said touchscreen.

6. The system of claim 1 wherein said sensor is further programmed to determine that said touchscreen is not going to be touched by said hand of said driver and is going to be touched by said hand of said passenger and wherein said control is further programmed to allow said touchscreen to be responsive to touching of said touchscreen by said passenger's hand.

7. The system of claim 6 wherein said touchscreen is centrally located on said dashboard, said driver being located left of said touchscreen and said passenger being located right of said touchscreen and wherein said sensor comprises a left-hand sensor and a right hand sensor, said left-hand sensor being located left of said touchscreen and said right-hand sensor being located right of said touchscreen.

8. The system of claim 7 further comprising:
a passenger seat belt buckle switch located in said vehicle; and
buckle switch logic for not permitting said touchscreen to be responsive to touching of said touchscreen by said passenger's hand if said passenger seat belt buckle switch is not closed.

9. The system of claim 8 further comprising:
a passenger seat included in said vehicle;
an occupant classification system (OCS) included in said vehicle; and
occupant logic for not permitting said touchscreen to be responsive to touching of said touchscreen by said passenger's hand if a signal from said OCS indicates that said passenger is not in said seat.

10. The system of claim 7 further comprising:
a passenger seat included in said vehicle;
an occupant classification system (OCS) included in said vehicle; and
occupant logic for not permitting said touchscreen to be responsive to touching of said touchscreen by said passenger's hand if a signal from said OCS indicates that said passenger is not in said seat.

11. The system of claim 1 wherein said sensor is further programmed to determine that said touchscreen is going to be touched by both said hand of said driver and by said hand of said passenger and wherein said control is further programmed to disallow said touchscreen to be responsive to touching of said touchscreen by said passenger's hand and/or said driver's hand.

12. The system of claim 11 wherein said touchscreen is centrally located on said dashboard, said driver being located left of said touchscreen and said passenger being located right of said touchscreen and wherein said sensor comprises a left-hand sensor and a right hand sensor, said left-hand sensor being located left of said touchscreen and said right-hand sensor being located right of said touchscreen.

13. The system of claim 1 wherein said sensor is an infrared sensor, an active infrared sensor or an ultrasonic sensor.

14. The system of claim 1 wherein touching said touchscreen with respect to a complex touchscreen operation includes one of: (a) using the touchscreen to enter a destination en route, (b) pairing a Bluetooth phone, (c) adding phonebook contacts or uploading phonebook contacts from a Universal Serial Bus (USB), (d) adding or editing address book entries, (e) enabling Valet Mode, (f) editing wireless settings and (g) editing Artist Alert.

15. A system, comprising:
a sensor that is programmed to determine that an operable dashboard-mounted touchscreen in a moving vehicle is going to be touched by a hand of a driver and/or a hand of a front-seat passenger of said vehicle based on particular proximity of said driver's hand and/or said passenger's hand to said sensor; and
a control that is programmed to allow or disallow, based on input from said sensor, said touchscreen to be responsive to touching of said touchscreen by said driver's hand and/or said passenger's hand;
wherein said sensor is further programmed to determine that said touchscreen is not going to be touched by said hand of said driver and is going to be touched by said hand of said passenger and wherein said control is further programmed to allow said touchscreen to be responsive to touching of said touchscreen by said passenger's hand;
wherein said touchscreen is centrally located on said dashboard, said driver being located left of said touchscreen and said passenger being located right of said touchscreen and wherein said sensor comprises a left-hand sensor and a right hand sensor, said left-hand sensor being located left of said touchscreen and said right-hand sensor being located right of said touchscreen,
the system further comprising:
a passenger seat belt buckle switch located in said vehicle; and
buckle switch logic for disallowing said touchscreen to be responsive to touching of said touchscreen by said passenger's hand if said passenger seat belt buckle switch is not closed.

16. The system of claim 15, further comprising:
a passenger seat included in said vehicle;
an occupant classification system (OCS) included in said vehicle; and
occupant logic for not permitting said touchscreen to be responsive to touching of said touchscreen by said passenger's hand if a signal from said OCS indicates that said passenger is not in said seat.

17. The system of claim 16 further comprising:
a passenger seat included in said vehicle;
an occupant classification system (OCS) included in said vehicle; and
    occupant logic for not permitting said touchscreen to be responsive to touching of said touchscreen by said passenger's hand if a signal from said OCS indicates that said passenger is not in said seat.

* * * * *

UNITED STATES PATENT AND TRADEMARK OFFICE
CERTIFICATE OF CORRECTION

PATENT NO. : 9,477,332 B2
APPLICATION NO. : 14/223081
DATED : October 25, 2016
INVENTOR(S) : Mark A. Cuddihy et al.

It is certified that error appears in the above-identified patent and that said Letters Patent is hereby corrected as shown below:

In the Claims

Column 7, Line 54, Claim 9 Change "8" to --7--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*